United States Patent
Muthukumaraswamy et al.

(10) Patent No.: US 6,863,710 B1
(45) Date of Patent: Mar. 8, 2005

(54) SINTER MIX ENHANCER

(75) Inventors: Margan K. Muthukumaraswamy, Singapore (SG); Mark A. Rohanna, Coogee (AT); Binod K. Das, Jamshedpur (IN); Ashok Kumar, Jamshedpur (IN); Harjit S. Sandhu, Jamshedpur (IN)

(73) Assignee: GE Betz, Inc., Trevose, PA (US)

( * ) Notice: Subject to any disclaimer, the term of this patent is extended or adjusted under 35 U.S.C. 154(b) by 0 days.

(21) Appl. No.: 10/690,893

(22) Filed: Oct. 22, 2003

(51) Int. Cl.[7] .............................................. C22B 75/751
(52) U.S. Cl. .............................. 75/751; 75/758; 75/759; 75/769
(58) Field of Search .......................... 75/751, 758, 759, 75/761, 765, 766, 767, 768, 769

(56) References Cited

U.S. PATENT DOCUMENTS

| 3,819,360 A | * | 6/1974 | Adams et al. ................. 75/762 |
| 3,975,185 A | | 8/1976 | Gross |
| 4,337,083 A | | 6/1982 | Sweat |

FOREIGN PATENT DOCUMENTS

JP 356000234 A * 1/1981

* cited by examiner

*Primary Examiner*—Melvyn Andrews
(74) *Attorney, Agent, or Firm*—Steven D. Boyd

(57) ABSTRACT

A method of improving the sintering of mineral bearing ore which comprises the addition of an aqueous solution of a transition metal sulfate, preferable copper sulfate, to the sinter base mix or to the sinter trim feed is disclosed.

2 Claims, No Drawings

SINTER MIX ENHANCER

FIELD OF THE INVENTION

The present invention relates to an improved method of sintering mineral ores used in a blast furnace. More particularly, the present invention relates to the treatment of a sinter mix with an aqueous transition metal sulfate to enhance the sintering operation.

BACKGROUND OF THE INVENTION

The present invention relates to a method of sintering sulfidic metals to metallic oxides. The metallic oxides are suitable as feed material to a blast furnace for the reduction of the metallic oxides and recovery of the elemental metal. More specifically, the present invention relates to a method of enhancing the sintering operation comprising treating the sinter mix with an aqueous transition metal sulfate.

In sintering, a shallow bed of fine particulates is agglomerated by heat exchange and particle fusion. Heat is generated by combustion of a solid fuel admixed with the bed of mineral bearing fines being agglomerated. The combustion is initiated by igniting the fuel exposed at the surface of the bed, after which a narrow, high temperature zone is caused to move through the bed by an induced draft usually applied at the bottom of the bed. Within the narrow combustion zone, the surfaces of adjacent particles reach fusion temperature and gangue constituents form a semi-liquid slag. The bonding is effected by a combination of fusion, grain growth and slag liquidation. The generation of volatiles from the fuel and fluxstone creates a frothy condition and the incoming air quenches and solidifies the rear edge of the advancing fusion zone. The product consists of a cellular mass of ore bonded in a slag matrix.

In the iron industry, the essential materials for sintering consist of a mixture of iron-bearing fines and a solid, particulated fuel. The iron-bearing constituents are principally iron fines, recycled sinter fines, and flue dust but may also include mill scale, open hearth precipitator dust, dust from basic oxygen steel production (BOP) and similar iron-bearing materials. Coke breeze is the most common solid fuel, but other carbonaceous materials can be used. It has also become common practice to incorporate limestone fines into the sinter mix. This composition of fine materials is well mixed and placed on the sinter strand in a shallow bed, seldom less than 6 inches or more than 20 inches in depth. Upon ignition, within a furnace which straddles the bed, the surface of the bed is heated to about 1269° to 1370° C., combustion of the fuel is initiated and the fine particles at the surface are fused together. As air is drawn through the bed, the high temperature zone of combustion and fusion moves downward through the bed and produces a bonded cellular structure.

During the process, the induced air is preheated by the hot sinter overlaying the combustion and fusion zone, and the sensible heat contained in the combustion products and in the excess air is transferred to the bed below the fusion zone.

The detailed design and physical placement of sintering equipment and the flow pattern of materials may differ considerably among various plants. The choice of equipment is generally based upon desired capacity, space availability, capital costs, the materials to be handled, and prevailing technology. Each plant can however, be subdivided into three distinct phases of operation. These are 1) raw material processing, 2) sinter production, and 3) product processing.

In the raw material processing operation, iron ore undergoes screening and benefication, typically at the mine, and the ore feed of −10 millimeters is accepted for sinter making. A separate raw materials system handles the balance of the materials, such as flue dust, fluxes, coke breeze, plant wastes, etc. The additives including coke breeze are crushed to a size range below −3 to −15 for preparation of a sinter mix and conveyed directly to storage bins. From the raw materials in storage bins, the desired materials are fed at controlled and specified rates onto a common collector belt. In order to provide homogeneity, bedding and blending of the raw materials is used in order to provide a definite proportion of materials for the sinter bed. Moisture for proper conditioning of the mix is added during the mixing and conditioning. The mixed and micro-pelletized feed is transferred to the sinter strand.

The production of the sinter per se occurs entirely on the sinter strand. Prior to feeding the raw mix, a grate layer of cold intermediate size sinter, usually 15–40 millimeters is fed onto the machine usually to a depth of 25 to 50 millimeters. This is done to reduce the temperature to which the grate bars are exposed; lower temperatures extend grate bar life. This layer also suffices to reduce the amount of fine material reaching and passing through the grate bars. The raw mix is fed directly onto the grate layer to a predetermined bed depth usually 300 to 500 millimeters. This is ignited by a furnace fired with a liquid or gaseous fuel, and the process of sintering is initiated. The speed of the machine (sinter strand) is regulated such that the high temperature zone of fusion reaches the grate layer as the material reaches the discharge end of the machine.

After ignition, suction fans pull air through the sinter bed into wind boxes located under the sinter strand and then into one or more collection mains essentially causing the forced air ignition and fusion of the sinter mix. Dust cleaning of the exhaust gases is done in cyclone separators or electrostatic precipitators.

Product processing begins at the discharge of the strand where the porous coherent lumps pass through a breaker. The large cake is reduced to a maximum size of 200 to 300 millimeters to facilitate cooling. The fines generated from this crushing operation are removed by a screen and recycled to the raw mix feed. The oversize is conveyed to sinter cooler. These are usually devices for passing air through the hot sinter bed. The purpose is to reduce the temperature of the sinter such that it maybe subsequently handled without damage to the conveying equipment. From the cooler, the sinter is cold screened, usually into three sizes. The smallest size, usually minus 5 millimeters, is recycled as cold return fines. An intermediate size, usually 10 millimeters by 40 millimeters, is either recycled as grate layer or sent to product storage depending on the needs of grate layer material. The coarsest size is sent directly to product storage.

SUMMARY OF THE INVENTION

The present inventors have discovered that the addition of a transition metal sulfate such as copper sulfate or manganese sulfate to the sinter mixture increases the speed of the sintering operation. The transition metal sulfate is preferably added as an aqueous solution to the sinter base mix or trim feed.

DETAILED DESCRIPTION OF THE PREFERRED EMBODIMENTS

A Blast Furnace is a counter current gas-solid reactor in which the solid charge materials move downward while the hot reducing gases flow upward. The best contact between the solids and the reducing gases is obtained with a permeable burden which permits a high rate of gas flow with minimum channeling of the gas. This is the primary reason for agglomeration of ores and fluxes. Mineral ore is crushed to produce defined grain sizes. Fine ores and concentrates (ultra-fine ores) developed during this crushing process are agglomerated for use in blast furnaces. The slag chemistry also is adjusted to produce a free flowing distinct slag layer. The process of agglomeration of fines and preparing fluxes to give the most desirable slag chemistry is sintering. Sintering requires grain sizes of greater than 2 mm. Particles less than 2 mm are made into pellets.

Increasing the sinter or pellet charges to a blast furnace increases the productivity of the furnace without a change in working volume. Moreover, having a homogenous furnace burden improves furnace stability, operation and reduces coke rates.

Sinter mix is made up of mineral bearing ores, steel mill wastes, fluxes such as lime, fluospar, dolomite, coke breeze and solid fuels. This premix is prepared in a bedding and blending operation. Controlled quantities of water are added in a precise ratio with the other components which are thereafter balled in a drum or disk baller.

The present inventors have discovered that the addition of a water-soluble or water dispersible transition metal sulfate to the water added to the sinter mix can enhance the sintering operation. The addition of the aqueous treatment of the present invention was discovered to accelerate the speed of sintering. The aqueous treatment of the present invention comprises a water soluble or water dispersible transition metal sulfate. The transition metal is preferably selected from the group consisting of copper, manganese, Barium, Iron and most preferably is copper. The aqueous treatment can be added to the sinter base mix or to the sinter trim feed prior to the sintering operation. The aqueous treatment preferably comprises from about 5 to about 35 parts per million transition metal sulfate and is added to the sinter base mix or trim feed in amounts from about 5 to 100 milliliters per ton of material. The addition of the aqueous treatment of the present invention was found to significantly increase the productivity of a sintering operation and allow higher sinter production.

The present invention will now be described with reference to specific examples. These examples are exemplary and are not intended to limit the scope of the present invention as defined in the claims.

EXAMPLES

An aqueous treatment comprising 16–25 parts per million copper sulfate was added to a sinter mix being processed in a commercial sintering machine. The operating parameters of the sinter machine were: Bed Height (including hearth layer) 600 mm; Hearth Layer 40 mm of size 15–25 mm; Ignition time 120 seconds; under grate suction 1250 mm Water Column (WC). Treatment rates were varied from 0 (control) to 50 milliliters per ton of sinter mix. Table 1 summarizes the results. Productivity is a measured of the mount of sinter produced (in metric tons) per square meter of strand per day. The data in Table 1 shows a significant increase in productivity when from about 20–50 milliliters per ton of the aqueous treatment solution was applied to either the base mix or treatment feed.

BTP (Burn Through Point), in minutes, was measured through maximum wind box temperature. The data in table 1 shows that the BTP decreased significantly when the aqueous treatment solution of the present invention was added to either the base mix or trim feed.

TABLE 1

| Treatment Feed (ml/T) | Productivity | | BTP Min | |
| --- | --- | --- | --- | --- |
| | Base Mix | Trim Feed | Base Mix | Trim Feed |
| 0 | 36.8 | 36.8 | 25.5 | 25.5 |
| 20.8 | 41.7 | 40.8 | 24 | 22.75 |
| 31.2 | 44.3 | 43.8 | 22.5 | 22 |
| 41.6 | 40.1 | 40.7 | 23.75 | 23.5 |
| 52 | 37.25 | 38.2 | 25.5 | 24.6 |

While the present invention has been described with respect to particular embodiments thereof, it is apparent that numerous other forms and modifications of the present invention will be obvious to those skilled in the art. The appended claims and this invention generally should be construed to cover all such obvious forms and modifications which are within the true spirit and scope of the present invention.

What is claimed is:

1. A method of sintering mineral ore wherein a sinter mix comprising a shallow bed of fine particles comprising mineral bearing ores and fuel is agglomerated by igniting the mixture so as to produce porous coherent lumps followed by breaking the porous coherent lumps into useful sizes and then cooling the resulting particles, the improvement comprising adding to sinter mix from about 5 to 100 milliliters per ton of the sinter mix of an aqueous solution of from about 5 to 35 parts per million a transition metal sulfate.

2. The method of claim 1, wherein said transition metal sulfate is selected from the group consisting of copper sulfate, manganese sulfate, barium sulfate, iron sulfate.

* * * * *